United States Patent
Xue et al.

(10) Patent No.: US 9,956,572 B2
(45) Date of Patent: May 1, 2018

(54) UNIVERSAL WHEEL SPRAYING PROTECTION DEVICE

(71) Applicant: CITIC Dicastal CO., LTD, Qinhuangdao (CN)

(72) Inventors: Bowen Xue, Qinhuangdao (CN); Jiandong Guo, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 0 days. days.

(21) Appl. No.: 15/364,393

(22) Filed: Nov. 30, 2016

(65) Prior Publication Data

US 2017/0182509 A1 Jun. 29, 2017

(30) Foreign Application Priority Data

Dec. 29, 2015 (CN) .......................... 2015 1 1006471

(51) Int. Cl.
  *B05B 15/04* (2006.01)
  *B60B 7/01* (2006.01)
  *B60B 7/00* (2006.01)

(52) U.S. Cl.
  CPC ........ *B05B 15/0487* (2013.01); *B05B 15/045* (2013.01); *B05B 15/0456* (2013.01); *B60B 7/00* (2013.01); *B60B 7/01* (2013.01); *B60B 2310/616* (2013.01)

(58) Field of Classification Search
  None
  See application file for complete search history.

(56) References Cited

U.S. PATENT DOCUMENTS

| | | | | |
|---|---|---|---|---|
| 2,634,704 A | * | 4/1953 | Morrison | B05B 15/0487 118/505 |
| 2,716,391 A | * | 8/1955 | Nonemaker | B05B 15/0487 118/505 |
| 2,927,824 A | * | 3/1960 | Simon | B60B 7/105 301/37.34 |
| 2,996,041 A | * | 8/1961 | Carpenter | B05B 15/0487 118/505 |
| 3,001,509 A | * | 9/1961 | Carpenter | B05B 15/0487 118/505 |
| 3,141,794 A | * | 7/1964 | Horner | B05B 15/0487 118/505 |
| 3,633,540 A | * | 1/1972 | Bolt | B05B 13/0228 118/502 |

(Continued)

*Primary Examiner* — Jethro M Pence
(74) *Attorney, Agent, or Firm* — Calfee, Halter & Griswald LLP

(57) ABSTRACT

The present invention provides a universal wheel spraying protection device, which is composed of a chassis, springs, a cone shaft, a tray, sliding blocks and composite tensioning sleeves. When the universal wheel spraying protection device is in use, a wheel is placed on a conical surface of an upper end of the tray, supporting springs are compressed by self weight of the wheel, and the tray is pressed down under the action of guiding columns and guiding sleeves; meanwhile, each sliding block drives the corresponding composite tensioning sleeve to move outwards under the action of the cone shaft; after a central hole is tensioned, the sliding blocks stops radial movement, and the tray also stops axial movement; and at this time, the central hole is protected by the composite tensioning sleeves, and a flange face is protected by the conical surface of the tray.

4 Claims, 3 Drawing Sheets

(56) References Cited

U.S. PATENT DOCUMENTS

| | | | | |
|---|---|---|---|---|
| 3,815,200 A * | 6/1974 | Adams | B21D 53/26 264/46.4 |
| 4,178,041 A * | 12/1979 | Rush | F16F 15/36 188/218 A |
| 4,291,077 A * | 9/1981 | Mundell | A41D 13/082 2/20 |
| 4,328,997 A * | 5/1982 | Connell | B60B 7/01 24/294 |
| 4,363,520 A * | 12/1982 | Connell | B60B 7/10 301/37.31 |
| 4,427,238 A * | 1/1984 | Connell | B60B 7/01 301/37.24 |
| 4,784,440 A * | 11/1988 | Fair | B05B 15/0487 118/505 |
| 4,790,506 A * | 12/1988 | Malinowski | A47B 19/00 248/441.1 |
| 5,058,958 A * | 10/1991 | Schartz | B05B 15/0487 118/505 |
| 5,423,559 A * | 6/1995 | Rhode | B62K 13/00 280/12.14 |
| 5,457,886 A * | 10/1995 | Fuller | B21D 53/32 29/894.38 |
| 5,597,213 A * | 1/1997 | Chase | B60B 7/00 301/37.11 |
| 5,630,654 A * | 5/1997 | Chase | B60B 7/00 301/37.11 |
| 5,795,035 A * | 8/1998 | Fuller | B60B 7/08 301/37.108 |
| 2002/0153763 A1 * | 10/2002 | Van Houten | B60B 7/0013 301/37.43 |

\* cited by examiner

UNIVERSAL WHEEL SPRAYING PROTECTION DEVICE

CROSS-REFERENCE TO RELATED APPLICATIONS

This application claims priority to Chinese Patent Application No. 201511006471.4, filed on Dec. 29, 2015, which is hereby incorporated by reference in its entirety.

TECHNICAL FIELD

The present invention relates to a spraying protection device, and in particular to a universal wheel spraying protection device used in a wheel spraying process.

BACKGROUND ART

In an aluminum alloy wheel production process, a coating process is a very important working process, which mainly provides excellent appearance effects and corrosion resistance for wheels. However, primer or colored paint cannot appear on to-be-mounted parts of the wheels generally. In order to achieve this purpose, in current all wheel manufacturing enterprises, flange faces and central holes of the wheels are usually separately protected, and utilized protection devices for the wheels of different sizes are different with each other. Therefore, the efficiency is low and operations are very inconvenient.

SUMMARY OF THE INVENTION

An object of the present invention is to provide a wheel spraying protection device, which can simultaneously protect a central hole and a flange face of a wheel, has the universality and can be fitted to wheels of different sizes.

To achieve the object described above, a technical solution of the present invention is as follows: a universal wheel spraying protection device is composed of a chassis, guiding sleeves, guiding columns, supporting springs, a cone shaft, a tray, reset springs, sliding blocks and composite tensioning sleeves. The cone shaft is mounted at a central position right above the chassis; the guiding sleeves are uniformly distributed and fixed on the chassis in a circumference direction; the guiding columns matching with the guiding sleeves are mounted under the tray; the supporting springs coat outer sides of the guiding columns and are arranged between the chassis and the tray; the sliding blocks matching with a conical surface of the upper end of the cone shaft are mounted in corresponding T-shaped sliding slots of the chassis; the composite tensioning sleeves are fixed on the sliding blocks; and the reset springs are mounted in the corresponding T-shaped sliding slots of the chassis and are arranged at the back of the sliding blocks.

The number of the guiding sleeves and the number of the guiding columns are three, and the number of the sliding blocks and the number of the composite tensioning sleeves are in one-to-one correspondence and are not less than four. Matching parts of the composite tensioning sleeves are overlapped with each other. An upper end face of the tray is conical.

During actual use, a wheel is placed on a conical surface of the upper end of the tray, the supporting springs are compressed by self weight of the wheel, and the tray is pressed down under the action of the guiding columns and the guiding sleeves; meanwhile, each sliding block drives the corresponding composite tensioning sleeve to move outwards under the action of the cone shaft; after a central hole is tensioned, the sliding blocks stops radial movement, and the tray also stops axial movement; and at this time, the central hole is protected by the composite tensioning sleeves, and a flange face is protected by the conical surface of the tray.

In use, the universal wheel spraying protection device provided by the present invention can simultaneously protect the central hole and the flange face of the wheel, has the universality and can be fitted to the wheels of different sizes; besides, the universal wheel spraying protection device has the characteristics of simple and useful structure, low manufacturing costs, convenience in use and safe and stabile performances.

Figure 1:
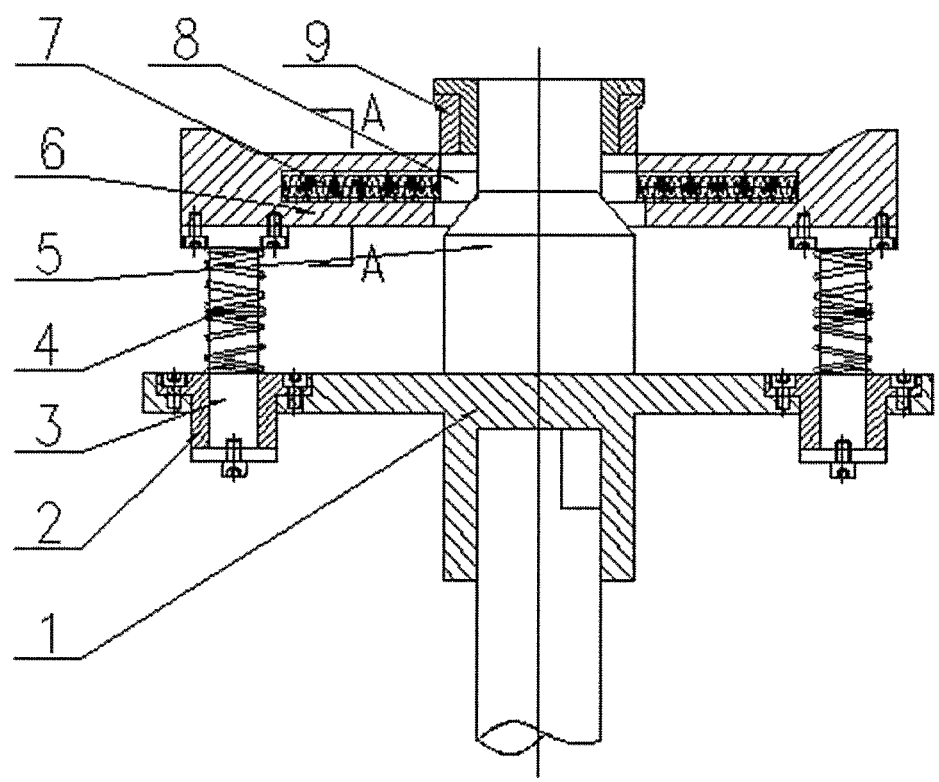
FIG. 1 is a front view of a universal wheel spraying protection device provided by the present invention.
Figure 2:
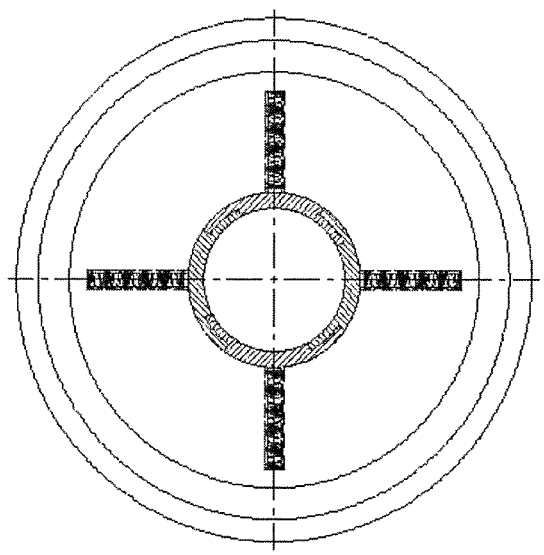
FIG. 2 is top view of a universal wheel spraying protection device provided by the present invention.
Figure 3:
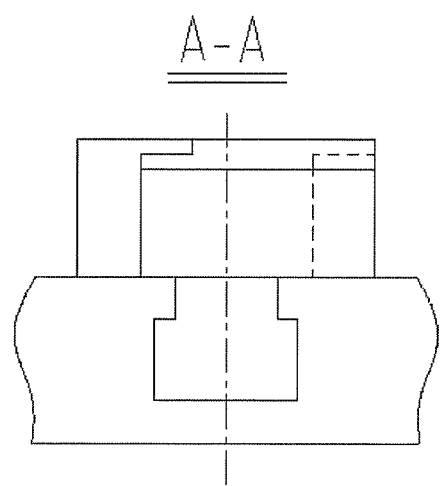
FIG. 3 is an A-direction cutaway view of a universal wheel spraying protection device provided by the present invention.
Figure 4:
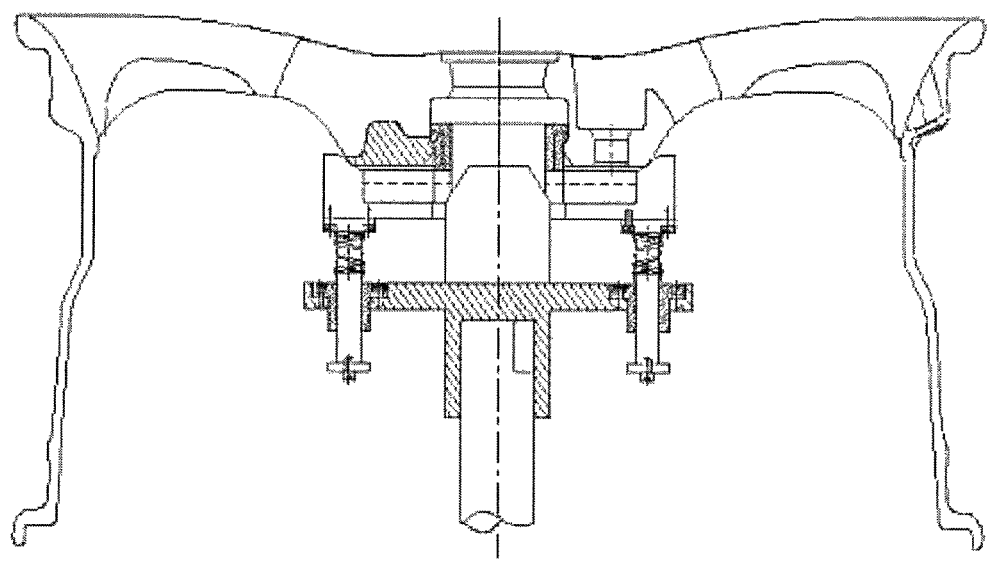
FIG. 4 is a front view of a universal wheel spraying protection device provided by the present invention in use.

In the figures, numeric symbols are as follows: 1—chassis, 2—guiding sleeve, 3—guiding column, 4—supporting spring, 5—cone shaft, 6—tray, 7—reset spring, 8—sliding block, and 9—composite tensioning sleeve.

DETAILED DESCRIPTION OF THE INVENTION

In the following, the details and working conditions of a specific device provided by the present invention are described in combination with figures.

A universal wheel spraying protection device is composed of a chassis 1, guiding sleeves 2, guiding columns 3, supporting springs 4, a cone shaft 5, a tray 6, reset springs 7, sliding blocks 8 and composite tensioning sleeves 9. The cone shaft 5 is mounted at a central position right above the chassis 1; the guiding sleeves 2 are uniformly distributed and fixed on the chassis 1 in a circumference direction; the guiding columns 3 matching with the guiding sleeves 2 are mounted under the tray 6; the supporting springs 4 coat outer sides of the guiding columns 3 and are arranged between the chassis 1 and the tray 6; the sliding blocks 8 matching with a conical surface of the upper end of the cone shaft 5 are mounted in corresponding T-shaped sliding slots of the chassis 1; the composite tensioning sleeves 9 are fixed on the sliding blocks 8; and the reset springs 7 are mounted in the corresponding T-shaped sliding slots of the chassis 1 and are arranged at the back of the sliding blocks 8.

The number of the guiding sleeves 2 and the number of the guiding columns 3 are three, and the number of the sliding blocks 8 and the number of the composite tensioning sleeves 9 are in one-to-one correspondence and are not less than four. Matching parts of the composite tensioning sleeves 9 are overlapped with each other. The upper end face of the tray 6 is conical.

In use, a wheel is placed on a conical surface of the upper end of the tray 6, the supporting springs 4 are compressed by self weight of the wheel, and the tray 6 is pressed down under the action of the guiding columns 3 and the guiding sleeves 2; meanwhile, each sliding block 8 drives the corresponding composite tensioning sleeve 9 to move outwards under the action of the cone shaft 5; after a central hole is tensioned, the sliding blocks 8 stops radial movement, and the tray 6 also stops axial movement; and at this time, the central hole is protected by the composite tensioning sleeves 9, and a flange face is protected by the conical surface of the tray 6.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A universal wheel spraying protection device, comprising:
    a chassis, guiding sleeves, guiding columns, supporting springs, a cone shaft, a tray, reset springs, sliding blocks and composite tensioning sleeves;
    characterized in that the cone shaft is mounted at a central position right above the chassis;
    the guiding sleeves are uniformly distributed and fixed on the chassis in a circumference direction;
    the guiding columns matching with the guiding sleeves are mounted under the tray;
    the supporting springs coat outer sides of the guiding columns and are arranged between the chassis and the tray;
    the sliding blocks matching with a conical surface of an upper end of the cone shaft are mounted in corresponding T-shaped sliding slots of the chassis;
    the composite tensioning sleeves are fixed on the sliding blocks; and
    the reset springs are mounted in the corresponding T-shaped sliding slots of the chassis and are arranged at a back of the sliding blocks.

2. The universal wheel spraying protection device according to claim 1, wherein a number of the guiding sleeves and a number of the guiding columns are three, and a number of the sliding blocks and a number of the composite tensioning sleeves are in one-to-one correspondence and are not less than four.

3. The universal wheel spraying protection device according to claim 1, wherein matching parts of the composite tensioning sleeves are overlapped with each other.

4. The universal wheel spraying protection device according to claim 1, wherein an upper end face of the tray is conical.

\* \* \* \* \*